United States Patent
Hoppe et al.

(10) Patent No.: US 12,377,690 B2
(45) Date of Patent: Aug. 5, 2025

(54) VEHICLE TIRE WITH NEW TIRE IDENTIFIER, METHOD FOR PRODUCING A VEHICLE TIRE WITH A NEW TIRE IDENTIFIER, HEATING MOLD FOR TIRES FOR PRODUCING SUCH A VEHICLE TIRE, AND USE OF A NEW TIRE IDENTIFIER ON SUCH A VEHICLE TIRE

(71) Applicant: Continental Reifen Deutschland GmbH, Hannover (DE)

(72) Inventors: Nicholas Hoppe, Wunstorf (DE); Jürgen Dzick, Seelze (DE)

(73) Assignee: Continental Reifen Deutschland GmbH, Hannover (DE)

( * ) Notice: Subject to any disclaimer, the term of this patent is extended or adjusted under 35 U.S.C. 154(b) by 1 day.

(21) Appl. No.: 18/251,976

(22) PCT Filed: Oct. 20, 2021

(86) PCT No.: PCT/DE2021/200155
§ 371 (c)(1),
(2) Date: May 5, 2023

(87) PCT Pub. No.: WO2022/096070
PCT Pub. Date: May 12, 2022

(65) Prior Publication Data
US 2024/0042806 A1    Feb. 8, 2024

(30) Foreign Application Priority Data
Nov. 9, 2020  (DE) ..................... 10 2020 214 007.3

(51) Int. Cl.
*B60C 13/00* (2006.01)
*B60C 11/24* (2006.01)

(52) U.S. Cl.
CPC ............ *B60C 13/001* (2013.01); *B60C 11/24* (2013.01)

(58) Field of Classification Search
CPC ....... B60C 13/001; B60C 11/03; B60C 11/24; B60C 2011/0337; B29D 30/68; B29D 2030/0612; B29D 2030/685
(Continued)

(56) References Cited

U.S. PATENT DOCUMENTS

2007/0175556 A1 * 8/2007 Brummer ................ B60C 11/00
152/209.1
2014/0345765 A1 * 11/2014 Amano ................... B60C 11/00
152/209.15
(Continued)

FOREIGN PATENT DOCUMENTS

CN          201099146 Y      8/2008
DE         202006002539 U1   6/2006
(Continued)

OTHER PUBLICATIONS

Rittweger, WO-2016030033-A1, machine translation. (Year: 2016).*
(Continued)

*Primary Examiner* — Sedef E Paquette
(74) *Attorney, Agent, or Firm* — Richard A. Wolf; Gregory Adams

(57) ABSTRACT

A vehicle tire having a tread face with at least one new tire marking which is at least partially higher than the surrounded surface of the tread face and is designed to wear out when the tire has been a carriageway to a degree indicative of a used tire. Also provided is a method for producing the vehicle tire in a tire heating mold having at least one at least partially engraved negative of the new tire marking. Also provided is the tire heating mold (2) for the method for producing the vehicle tire.

10 Claims, 2 Drawing Sheets

(58) Field of Classification Search
USPC .................................. 152/151, 209.1, 209.3
See application file for complete search history.

(56) References Cited

U.S. PATENT DOCUMENTS

2017/0100967 A1* 4/2017 Abe ..................... B60C 11/16
2018/0304696 A1  10/2018 Tokitoh et al.
2021/0129597 A1   5/2021 Iwabuchi

FOREIGN PATENT DOCUMENTS

| EP | 3369589 A1 | 9/2018 | |
| EP | 3412477 A1 | 12/2018 | |
| EP | 3524446 A1 | 8/2019 | |
| JP | 2013180588 A | 9/2013 | |
| JP | 2017071302 A | 4/2017 | |
| WO | WO-2016030033 A1 * | 3/2016 | ............. B60C 11/24 |

OTHER PUBLICATIONS

International Search Report dated Jan. 4, 2022 of International Application PCT/DE2021/200155 on which this application is based.

* cited by examiner

VEHICLE TIRE WITH NEW TIRE IDENTIFIER, METHOD FOR PRODUCING A VEHICLE TIRE WITH A NEW TIRE IDENTIFIER, HEATING MOLD FOR TIRES FOR PRODUCING SUCH A VEHICLE TIRE, AND USE OF A NEW TIRE IDENTIFIER ON SUCH A VEHICLE TIRE

Tire markings are generally located in vehicle tires in the lateral region of the vehicle tire and are primarily used for consumer information. A tire marking comprises inter alia the speed index, the brand, the tire size and the manufacturing date (DOT number). Other markings indicate the manufacturer or additional information items. Markings in the lateral region are generally subjected to no wear so that they are visible over the entire service-life of a vehicle tire for the consumer. Therefore, markings are not typical in the region of the tread face of a vehicle tire. In the prior art, markings on a tread face of a vehicle tire are known. Thus, EP 3 369 589 A1 discloses shallow grooves in a tread face portion of a new tire for a motorcycle which are intended to indicate the performance of a new tire in good time by visually confirming that the new tire is worn to a specific extent.

However, a problem in such markings in the prior art is that they can subsequently be produced in the new state on the tread face of a vehicle tire and are consequently not suitable as a new tire marking. For example, a marking can be engraved relatively easily with a laser in the tread face. Thus, these markings cannot provide the consumer with any reliable information as to whether the vehicle tire is new or used.

The present invention applies here. The object of the present invention is to provide a vehicle tire having a marking which identifies the vehicle tire as being new and is tamper-resistant. Another object of the present invention is to provide a method for producing a vehicle tire, by which a marking which identifies the vehicle tire as being new for the consumer is produced on a vehicle tire. Another object of the present invention is to provide a tire heating mold by which a marking which identifies the vehicle tire as being new can be produced on a vehicle tire. Another object of the invention is to provide a use of a marking which identifies the vehicle tire as being new.

The problem is solved by a vehicle tire, having a tread face, the tread face having at least one new tire marking, the surface of which is at least partially higher than the surrounded surface of the tread face. For the purposes of the invention, a surface that is made higher is a surface that is raised with respect to the surface of the tread strip of the vehicle tire. Advantageously, the new tire marking wears away as a result of the partially higher surface as soon as the vehicle tire is used. Consequently, the new tire marking identifies the vehicle tire only in the new, unused state. It is also advantageous for such a new tire marking not to be able to be applied subsequently to the surface of a vehicle tire so that such a new tire marking is tamper-resistant. Furthermore, such a new tire marking can transmit additional consumer information items, such as, for example, assembly directions.

The tread face or the surface of the tread strip can be configured differently depending on the vehicle tire type. According to the invention, the surface of the tread strip is the outermost surface of the vehicle tire which is in direct contact with the carriageway. It is conceivable for the tread face to extend in the lateral region of a tire. The wear of the tread face leads to a more powerful wear of the new tire marking in comparison with the surrounded surface of the tread face, whereby the new tire marking disappears after a specific travel time. It is important that the tread face is at least partially in contact with the carriageway during travel so that the new tire marking is worn during the travel.

New tire markings may have ventilation structures, but are not used as ventilation structures which are produced at or on the surface as a result of the production method of the vehicle tire. Such ventilation structures comprise, for example, cylindrical lateral flows of minivents or plate-like impressions of Eurovents or linear lateral flows of ventilations over the molded segment limits. New tire markings further differ from "Color Markers" which identify a vehicle tire with a colored element which can also be applied subsequently. At the same time, a new tire marking can also be used as an information carrier and can consequently replace the function of the color marker.

New tire markings on a surface of a tread strip are conceivable on all types of vehicle tires. The term "vehicle tire" is intended to be understood to be a car tire according to the invention. Furthermore, motorcycle tires, tires for agricultural vehicles, trailer tires, aircraft tires or other types of tires are also conceivable.

It is conceivable for only one new tire marking to be arranged on a surface of a tread face of a vehicle tire. It is also conceivable for at least two new tire markings, particularly a large number of new tire markings to be arranged on a surface of a tread face of a vehicle tire. Advantageously, at least two new tire markings, particularly a large number of new tire markings are located on the tread face so that the tire is identified in a particularly tamper-evident manner.

In another embodiment of the invention, the surface of the new tire marking has at least one first region which is a maximum of 150 micrometers, in particular a maximum of 100 micrometers higher than the surrounded surface. It has advantageously been found that a new tire marking with a maximum projection of 150 micrometers does not lead to a deterioration of the property in relation to the performance of the vehicle tire.

Furthermore, it is preferably conceivable for the raised surface to be at least partially a maximum of 80 micrometers higher than the surrounded surface of the tread face. Advantageously, a different highly contrasting impression for the consumer is produced if the height is at least partially a maximum of 80 micrometers. In a further preferable manner, it is conceivable for the height to be a maximum of micrometers, particularly preferably a maximum of 40 micrometers. Advantageously, a particular optical impression may result for the consumer if the new tire marking is a maximum of 60 micrometers, preferably 40 micrometers higher than the surrounded surface of the tread face.

In another embodiment of the invention, the first region of the surface surrounds a second lower region which is preferably at least partially lower than the surrounded surface of the tread face. Advantageously, a better contrast for the consumer is produced if the periphery of the new tire marking is raised and the inner second region of the surface is constructed to be lower. A substantially better contrast is achieved in that the inner second surface is lower than the surrounded surface of the tread face.

In another embodiment of the invention, the second lower region is a maximum of 150 micrometers, in particular a maximum of 100 micrometers lower than the surrounded surface of the tread face. Advantageously, a substantial contrast is produced for the consumer if the second internal surface is a maximum of 150 micrometers lower than the surrounded surface of the tread face. Furthermore, it is preferably conceivable for the second surface to be a maximum of 80 micrometers lower than the surrounded surface of the tread face because advantageously a different contrast for the consumer is produced.

It is further conceivable for the second internal surface preferably to be a maximum of 60 micrometers, in particular a maximum of 40 micrometers lower than the surrounded surface of the tread face so that advantageously a different contrast for the consumer is produced.

In another embodiment of the invention, the first and/or second region has/have a surface structuring which is more highly contrasting relative to the surrounded surface of the tread face, wherein it is/they are preferably roughened. Advantageously, a surface with a highly contrasting surface structuring is substantially more easily visible for the consumer. Thus, new tire markings which receive an optical depth as a result of the differently raised and highly contrasting surfaces can be produced. It is conceivable for the surface preferably to be roughened. It is further conceivable for the surface to have serrations which produce a particular optical contrast for the consumer.

In another embodiment of the invention, the at least one new tire marking is visible only in the new state of the vehicle tire. Advantageously, the at least one new tire marking disappears as a result of the abrasion of the surface of the tread face so that such a new tire marking is only visible when the tire is in the new state. Advantageously, such a new tire marking cannot subsequently be applied to the surface of the tread face so that it is substantially more tamper-resistant than other markings in the prior art.

In another embodiment of the invention, the at least one new tire marking has at least one hatching and/or a symbol and/or at least one mark and/or at least one figure and/or at least one letter. It may be advantageous for the consumer if the new tire marking indicates, for example, a company. A logo is conceivable, for example. It is further conceivable for the at least one new tire marking to be an energy label and/or a label "Made in Germany". It is further conceivable to use a bar code. Advantageously, consequently, the consumer receives additional information about the quality of the vehicle tire, wherein this information is visible only in the new state and disappears by use as a result of abrasion.

In another embodiment, the invention is directed toward a method for producing a vehicle tire having at least one new tire marking, in particular a described vehicle tire, wherein the vehicle tire is produced in a tire heating mold, wherein the tire heating mold has at least one at least partially engraved negative of a new tire marking in the region of the tread face. Advantageously, the at least one new tire marking can be produced only in the production method on the surface of the tread face of a vehicle tire. Such a new tire marking is consequently substantially more tamper-evident because it cannot be applied to the tread face subsequently. Tire heating molds, such as, for example, a milling mold and/or a casting mold, are conceivable. Other molds are also conceivable. An engraved negative of a new tire marking can be produced, for example, by a laser on the inner face of the tire heating mold in the region of the tread face. However, other types are also conceivable. The important aspect is that the negative of the new tire marking is a negative image of the new tire marking, which is intended to be produced, on the tread face of the vehicle tire. It is conceivable for the surface structure to be produced already to have been produced as a negative image in the tire heating mold. Alternatively, it is conceivable for the surface structure of the new tire marking to be contrasted after the production of the new tire marking by the surface, for example, being roughened. Advantageously, a highly contrasting depiction of a new tire marking is thus produced for the consumer.

The already-described embodiments with respect to the vehicle tire can relate vice versa to the method according to the invention.

In another embodiment of the invention, the engraved negative of the new tire marking has a surface having at least one first engraved region which is at least partially a maximum of 150 micrometers, in particular a maximum of 100 micrometers lower than the surrounded mold surface of the tread face. The mold surface of the tread face is the region of the tire heating mold which depicts the tread face of the tire after the vehicle tire is produced. Advantageously, the at least partially engraved negative in the tire heating mold has a recess having a depth difference of at least partially a maximum of 150 micrometers, in particular a maximum of 100 micrometers so that the new tire marking has a projection on the surface of the tread face. Accordingly, the new tire marking disappears after the tire is used so that the new tire marking identifies the vehicle tire simply in the new state. Furthermore, the method is advantageous because such a new tire marking cannot be applied subsequently to a vehicle tire and is consequently tamper-resistant.

Furthermore, the recess of the at least partially engraved negative is preferably a maximum of 80 micrometers, particularly preferably a maximum of 60 micrometers, more particularly preferably a maximum of 40 micrometers. Advantageously, a particular optical impression is produced for the consumer with such a recess.

In another embodiment of the invention, the first engraved region of the surface surrounds a second higher engraved region which is preferably at least partially higher than the surrounded mold surface of the tread face. The surrounded mold surface of the tread face is according to the invention the internal surface of the tire heating mold which depicts the negative of the tire surface. The negative of the new tire marking can be constructed to be, for example, partially higher than the surrounded surface of the mold surface in order to subsequently produce on the tread face of the tire an impression, which is more highly contrasting for the consumer, of the new tire marking. This is particularly possible by the new tire marking having different heights or depths.

In another embodiment, the invention is directed toward a tire heating mold for a described method for producing a vehicle tire having at least one new tire marking, in particular a described vehicle tire, wherein the tire heating mold has an engraved negative of a new tire marking in the region of the tread face. Advantageously, using such a tire heating mold there can be produced on the tread face of a vehicle tire a new tire marking which identifies the tire as being new and which cannot be applied subsequently to the tread face. As a result of the described tire heating mold, for example, a tire can be produced with a new tire marking which is tamper-resistant.

The already-described embodiments with respect to the vehicle tire and the method can relate vice versa to the tire heating mold according to the invention.

In another embodiment of the invention, the invention further relates to use of a new tire marking on a tread face of a described vehicle tire for identifying the new state of the vehicle tire. Advantageously, by using a new tire marking on a tread face of a vehicle tire, the vehicle tire can be identified only in the new state. The use of new tire markings on the tread face of a vehicle tire is not conventional in the prior art, particularly not new tire markings which have a raised surface in comparison with the surrounded surface of the tread face.

DESCRIPTION OF THE FIGURES

Further details and advantages of the present invention will be appreciated from the following description of the embodiments in connection with the drawings. In the drawings:

FIG. 1 shows a cutout of a vehicle tire 1 and a tire heating mold 2 as a side view. The vehicle tire 1 has on the tread face 3 a new tire marking 4 with a surface 5 of the new tire marking, wherein the surface 5 is higher than the surrounded surface of the tread face 3. The height difference 6 is the difference between the surface 5 of the new tire marking and the surrounded surface of the tread face 3. Furthermore, the vehicle tire 1 has a second new tire marking 7 and a third new tire marking 8, which correspond to the new tire marking 3.

Figure 1:
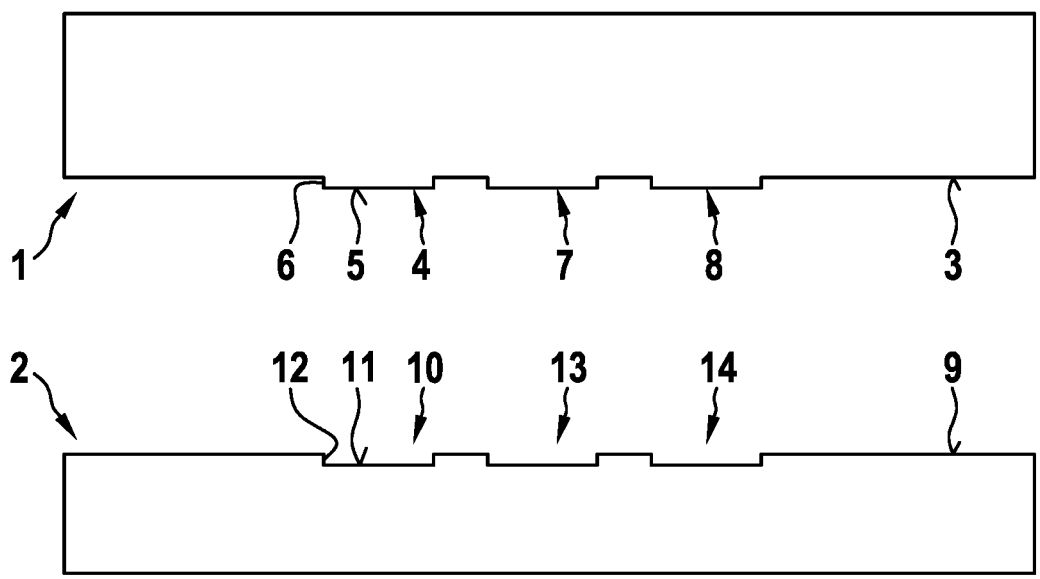
FIG. 1 shows a schematic side view of a vehicle tire with a new tire marking and a tire heating mold.

Furthermore, the tire heating mold 2 comprises a mold surface 9 in the region of the tread face, wherein a negative of the new tire marking 10 is engraved on the mold surface 9. The negative of the new tire marking 10 has an engraved surface 11 which is lower than the surrounded surface of the mold surface 9. The depth difference 12 in the tire heating mold 2 corresponds to the height difference 6 of the first new tire marking 4 minus the shrinkage which is disregarded as a simplification. The tire heating mold 2 further has on the mold surface 9 a negative of the second new tire marking 13 and a negative of the third new tire marking 14. The surface of the tread face 3 of the vehicle tire 1 is generally determined by the mold surface 9 of the tire heating mold 2 in the region of the tread face.

Figure 2:
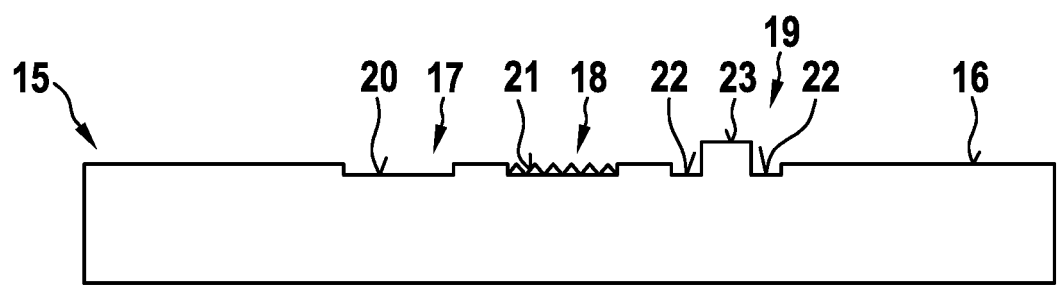
FIG. 2 shows a schematic side view of a tire heating mold and FIG. 3 shows a plan view of a tread face of a vehicle tire.

FIG. 2 shows an additional possible tire heating mold 15 with a mold surface 16 and a negative of a new tire marking 17, an additional serrated negative of a new tire marking 18 and an additional U-shaped negative of a new tire marking 19. The negative of the new tire marking 17 has the engraved surface 20 which is lower than the surrounded surface of the mold surface 16. The engraved surface 20 has a planar surface structure. However, the serrated negative of a new tire marking 18 has a serrated surface 21. Only a portion of the serrated surface 21 is lower than the surrounded mold surface 16 in the region of the tread face. Furthermore, the U-shaped negative of a new tire marking 19 has a first lower surface 22 and a second higher surface 23. The higher surface 23 is higher than the surrounded surface 16.

Figure 3:
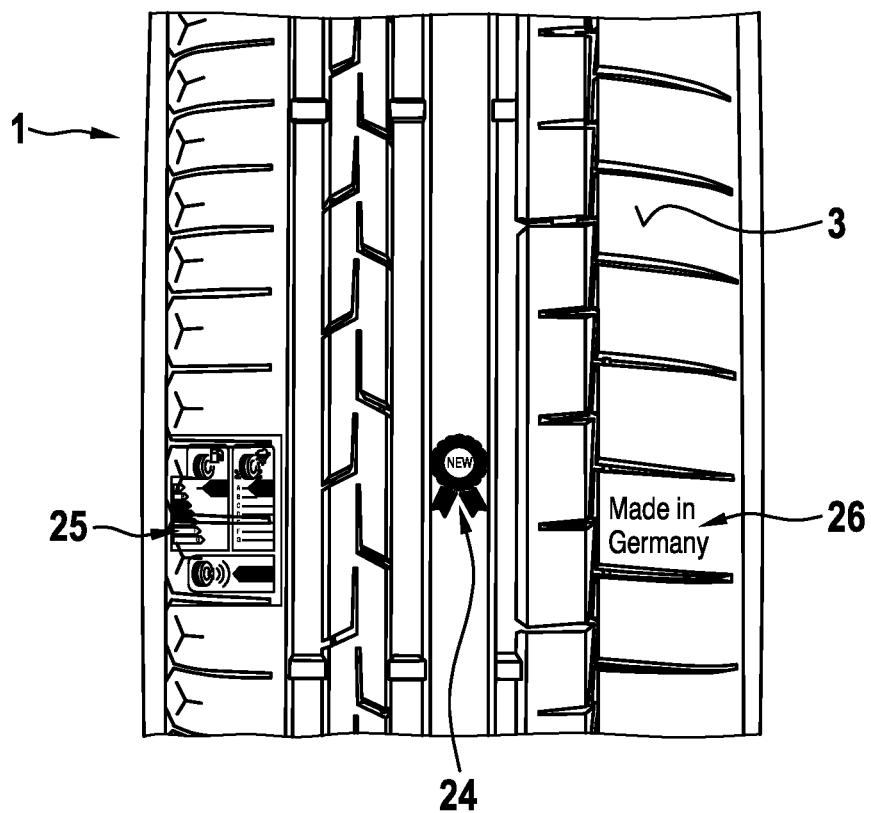

FIG. 3 shows a vehicle tire 1 as a plan view of the tread strip. The vehicle tire 1 has a tread face 3, wherein a new tire marking "NEW" 24 is arranged on the tread face 3. Furthermore, the vehicle tire 1 has a new tire marking with an energy label 25 and a new tire marking "Made in Germany" 26.

LIST OF REFERENCE NUMERALS

1 Vehicle tire
2 Tire heating mold
3 Tread face
4 New tire marking
5 Surface of the new tire marking
6 Height difference
7 Second new tire marking
8 Third new tire marking
9 Mold surface
10 Negative of new tire marking
11 Engraved surface
12 Depth difference
13 Negative of second new tire marking
14 Negative of third new tire marking
15 Additional tire heating mold
16 Mold surface of additional tire heating mold
17 Negative of a new tire marking of additional tire heating mold
18 Serrated negative of a new tire marking
19 U-shaped negative of a new tire marking
20 Planar surface
21 Serrated surface
22 First lower surface
23 Second higher surface
24 New tire marking "NEW"
25 New tire marking with energy label
26 New tire marking "Made in Germany"

The invention claimed is:

1. A vehicle tire comprising:
a tread face having a tread surface;
a tire marking on the tread face which is at least partly surrounded by the tread surface, the tire marking comprising a label or symbol formed a marking surface;
wherein the marking surface is at least partly higher than the surrounding tread surface and is integrally formed during tire molding such that the marking is lamper-resistant;
wherein the marking surface has a first region that is higher than the surrounding tread surface in a range from 40 micrometers to 100 micrometers above the tread surface so as to at least provide visual detectability of the first region of the marking while also promoting wear-out of the first region when used no a carriageway to a degree indicative of a used tire;
wherein the marking surface has a second region surrounded by the first region, the second region being lower than the first region; and
wherein the second region is lower than the surrounding tread surface by at most 150 micrometers so as to enhance visual contrast of the marking and so that at least the second region of the marking remains visible after the first region has worn away, thereby providing a residual indication of the marking and secondary level of detecting usage of the tire.

2. The tire of claim 1, the first region has a roughened surface.

3. The tire of claim 1, the second region has a roughened surface.

4. The tire of claim 1, wherein the symbol or label includes a figure, and/or a letter.

5. The tire of claim 1, further comprising a tire heating mold to form the tread and the marking.

6. The tire of claim 1, the label includes assembly directions.

7. The tire of claim 1, the label includes a bar code.

8. The tire of claim 1, the fire label includes an energy label.

9. The tire of claim 1, wherein the first region is higher than the surrounding tread surface in a range from 40 micrometers to 80 micrometers.

10. The tire of claim 1, wherein the first region is higher than the surrounding tread surface in a range from 60 micrometers to 100 micrometers.

\* \* \* \* \*